United States Patent [19]
Murphy

[11] 3,938,762
[45] Feb. 17, 1976

[54] ROTOR BLADE FORCE TRACK SENSING SYSTEM AND AUTOMATIC SPAN TRACKING SYSTEM

[75] Inventor: Milford R. Murphy, Arlington, Tex.

[73] Assignee: Textron, Inc., Providence, R.I.

[22] Filed: May 20, 1974

[21] Appl. No.: 471,177

[52] U.S. Cl. ............ 244/17.13; 73/462; 244/17.27; 416/31; 416/500
[51] Int. Cl.² ........................................ B64C 11/44
[58] Field of Search .......... 73/455, 462; 244/17.11, 244/17.13, 17.27, 77 R; 416/31, 35, 43, 500

[56] References Cited
UNITED STATES PATENTS

| | | | |
|---|---|---|---|
| 2,936,836 | 5/1960 | Ellis | 244/77 R X |
| 3,175,786 | 3/1965 | Frank et al. | 244/17.13 |
| 3,228,252 | 1/1966 | Trimble | 73/462 |
| 3,298,443 | 1/1967 | Burkam et al. | 416/500 X |
| 3,386,031 | 5/1968 | Able et al. | 73/455 X |
| 3,795,375 | 3/1974 | Lemnious | 416/31 X |

Primary Examiner—George E. A. Halvosa
Assistant Examiner—Stephen G. Kunin
Attorney, Agent, or Firm—Richards, Harris & Medlock

[57] ABSTRACT

In eliminating one-per-rev vibration in a helicopter due to rotor unbalance, a one-per-rev vibration signal manifestation of rotor unbalance is generated and sampled when the rotor blades are successively in alignment with a reference direction during each cycle of rotation of said rotor. A difference signal is generated from the samples to represent by magnitude and phase the character of the unbalance. The rotor is modified in magnitude proportional to the magnitude of the signal and in direction dependent upon the span and chord components of the signal. In one aspect the force track error signal is applied to the input of a cyclic pitch control actuator system dynamically to automatically correct span unbalance forces.

23 Claims, 6 Drawing Figures

3,938,762

ROTOR BLADE FORCE TRACK SENSING SYSTEM AND AUTOMATIC SPAN TRACKING SYSTEM

BACKGROUND OF THE INVENTION

This invention relates in general to eliminating one-per-rev vibratory forces in rotary wing aircraft and more particularly to sensing the magnitude and span or chord inertial or aerodynamic direction of each of a plurality of unbalanced radial forces and bending moments acting on a helicopter mast to correct the cause of the unbalance. The invention more specifically is addressed to force tracking helicopter rotors.

Vibration is generally undesirable in rotating machinery. This is particularly true in helicopters. Not only does vibration cause excessive noise and physical discomfort to passengers and crew, but it also causes joints and fasteners to loosen and can contribute to fatigue stress failures in vital components. Consequently, it is important for safety and comfort that helicopter vibration be minimized.

Rotating helicopter blades comprise a primary source of helicopter vibration. A first cause of vibration may be that the blades are out of inertial balance, i.e., the center of gravity is displaced from the mast axis. When such blades rotate, a radial force having a frequency of one cycle per-revolution acts perpendicularly to the axis of the mast and is of magnitude proportional to the unbalance.

A second cause of vibration is aerodynamic unbalance. This unbalance is caused by the center of lift being displaced from the center of rotation and/or by the rotor blades having different drag characteristics. The resultant forces act on the mast. In such a case, the center of rotation of the blades wobbles about the mast axis. A bending moment is transmitted by the mast through its bearings to the rotor pylon where reaction forces cause vibrations of a one-per-revolution frequency in the airframe.

Inertial unbalance produces a radial force at the mast hub. Aerodynamic unbalance produces a bending moment and/or a radial force about the mast hub. Both result in forces which produce undesired vibration in the frame of the helicopter. The problem is to isolate the causes of unbalance in the environment of a complex set of forces and eliminate or compensate them.

Likelihood of inertial unbalance can be reduced by careful manufacturing and assembly procedures in which the rotor blades are matched for weight to locate the center of gravity at the center of the mast so that the centrifugal forces produced by the blades are as equal as possible. To the extent that manufacturing and assembly techniques are not perfect, a residual inertial unbalance condition can remain.

Some of the factors which cause aerodynamic unbalance can also be minimized during manufacture and assembly by careful match in the airfoil shapes of each blade and careful alignment of the individual blade pitch and sweep angle adjustment mechanisms. With blades matched and properly assembled, subsequent warping and play in the pitch and sweep angle adjustment linkages may result in substantial unbalance.

Prior methods for correcting rotor unbalance have several disadvantages, among which are that they are indirect and approximate. They are based upon a questionable assumption that all forces will be in balance when the blades geometrically track in the same plane.

One purpose of this invention is to provide a response to unbalanced radial forces acting on rotating helicopter masts and to define the sources causing the unbalance and to indicate the magnitude and direction of the compensating change necessary to minimize the vibration.

Further, there is provided a continuous monitor of the force track of helicopter rotor blades to aid in making corrections necessary to minimize vibrations from aerodynamic and inertial unbalance of the rotor assembly.

It is a still further object of the invention to provide a helicopter rotor force track sensing device which is accurate, reliable, simple and relatively inexpensive.

It is another object of the invention to provide in a force track sensing device of the character described, an output signal which is adapted either for visual display or for use in a servo control system for automatically correcting out of selected balance conditions.

SUMMARY OF THE INVENTION

Briefly, the invention involves sampling the magnitude of radial unbalanced mast forces and bending moments exerted by the rotor system when each rotor blade is aligned with a reference angular direction with respect to the mast support structure and comparing the sampled forces. The algebraic difference between the compared signals is a measure of the unbalance.

In one form, a vibration sensor is mounted to sense manifestation of rotor unbalance causing vibration of the mast support structure. As the mast rotates, unbalanced forces create a sinusoidal vibration in the support structure at the location of the sensor of frequency equal to the speed of shaft rotation. A radial force is sensed when the resultant of the unbalanced forces coincides with a reference direction. A radial force in the opposite direction is sensed when the resultant has rotated 180 degrees from the reference direction. The vibration sensor and associated detector circuitry provides a signal proportional to this sinusoidal reaction force or force track error.

A rotor blade azimuthal position sensor is mounted on the support structure and properly phased relative to the vibration sensor to establish an azimuthal direction reference. The sensor provides position signals when each rotor blade is aligned with the selected reference direction. One rotor blade is chosen as a reference blade. The component of the unbalance force signal induced when the reference blade position coincides with the selected reference direction becomes the reference signal.

In order to obtain a signal proportional to the component of the unbalance force exerted by the rotor, a sampling system responsive to the signals from the azimuthal sensor selects discrete force signal samples from the vibration sensor output when each rotor blade is aligned with the reference direction.

In one embodiment signal storage units are gated by the position signals to sample and hold instantaneous values of the vibration sensor signal when each blade is at the reference position. Each sample is stored until replaced by a new sample on the next revolution. The reference signal sample is continuously compared with the sample obtained when the other blade is aligned with the reference direction. The difference represents the amount by which the total aerodynamic and inertia forces for the second blade position differ from those of the reference blade position. This difference displayed by a null-type meter is used to direct the proper action for correcting the unbalance forces to null the meter signal. The difference signals due to unbalanced lift forces are also used to drive a servo system for automatically controlling blade pitch angles to eliminate aerodynamic unbalance in the span sense.

DRAWINGS

In the accompanying drawings which illustrate the function and show one embodiment of the invention adapted for sensing the force track of helicopter rotor shafts:

THE PREFERRED EMBODIMENT

It is reiterated that there may exist two basically different types of unbalance. One source of unbalance is due to physical weight distribution such that the center of gravity is not at the center of rotation. This is inertial unbalance. The second is due to displacement of the center of lift from the center of rotation. This is aerodynamic unbalance.

Figure 1:
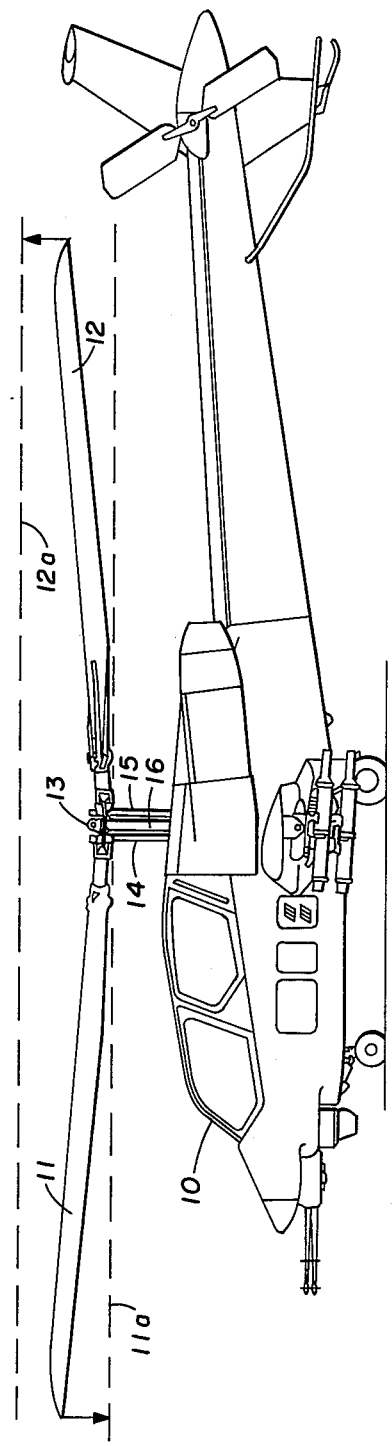
FIG. 1 is a side view of a two-bladed helicopter showing geometric out of track rotation of the rotor blades.

Referring to FIG. 1, helicopter 10 has a main rotor with two blades 11 and 12 which are attached to hub 13 by conventional grips and which are controlled as to pitch through their respective pitch angle control linkages 14 and 15. The rotor assembly is turned by vertical mast 16.

The rotor blades 11 and 12 generate lift depending upon blade pitch angles as controlled through linkages 14 and 15. Blades significantly out of track may trace blade tip paths 11a and 12a, shown dotted. Failure to track may be due to either or both inertial unbalance, aerodynamic unbalance or a combination of both.

Figure 2:
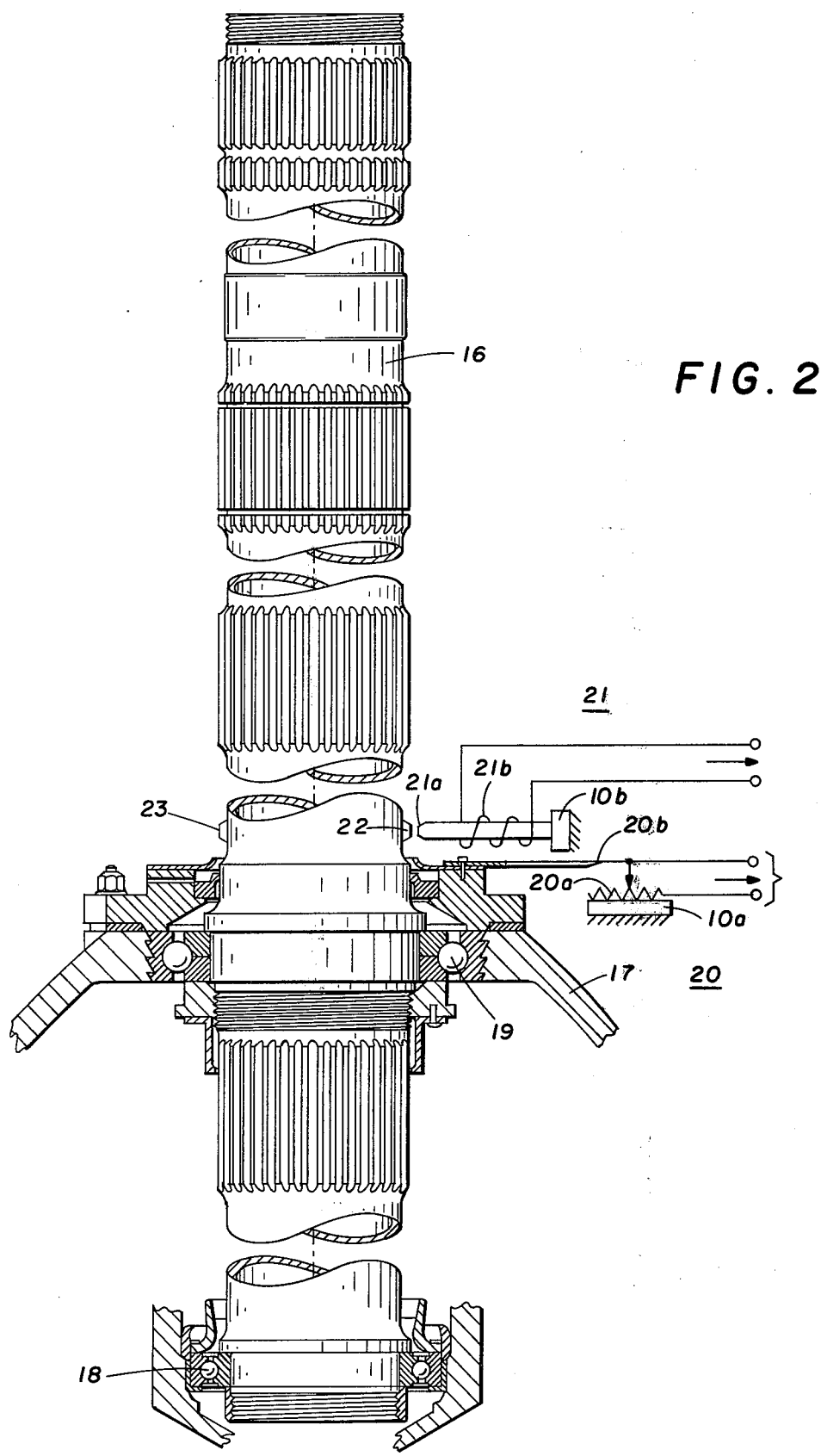
FIG. 2 is a sectional view of a typical support for a mast.

As shown in FIG. 2, mast 16 is rotatably mounted in a housing 17 by means of radial support bearing 18 and combination radial and thrust bearing 19. Housing 17 is cushion mounted in an associated airframe in a manner that generally accommodates some mast motion relative to the airframe. The mount generally is more stiff fore and aft than laterally.

In the embodiment shown, a vibration sensor 20 is mounted adjacent to radial support bearing 19. Vibration sensor 20 is a sensor responsive to the magnitude of motion of the pylon in a given direction. More particularly, a potentiometer element 20a is mounted on a suitable portion 10a of the airframe. A variable tap 20b is mounted on housing 17. Movement of housing 17 relative to element 10a may thus be sensed. The output is proportional to and in phase with the relative motion. Sensor 20 is mounted with its sensitive axis aligned radially with respect to mast 16 so as to respond primarily to unbalance forces exerted by the rotor assembly through radial bearing 19. In terms of FIG. 3, the sensitive axis of vibration sensor 20 is aligned with a fore and aft radial passing through the center of mast 16 which is selected as a reference direction.

Rotor position sensor 21 (FIG. 2) is mounted adjacent to mast 16 on a radial position that effects proper phasing relative to sensor 20. More particularly, because the pylon including mast 16 is mounted with resilience at point 17a where it is connected to the airframe, the actual motion of the mast 16 lags the force producing the motion. The phase angle lag is characteristic of a given ship. In the ship disclosed in FIG. 1, the phase angle was about 140°. Thus, if sensor 20 is mounted on the fore/aft axis of the ship, the position sensor 21 would be mounted 140° lag therefrom. Sensor 21 provides a position signal to identify the relative position of each rotor blade relative to the reference direction. Position sensor 21 is shown as a magnetic pickoff wherein a core 21a is mounted on an airframe element 10b with a winding 21b thereon. Ferrous teeth 22 and 23 are mounted on mast 16 at diametrically opposed points aligned with blades 11 and 12, respectively. Any suitable type of position pickoff such as a photocell, or a cam-operated microswitch, may be employed. Because of the need for reliable operation under severe environmental conditions, the magnetic type of pickoff is preferred. Pickoff 21 senses the passage of teeth 22 and 23.

In order to differentiate between the two angular shaft positions, tooth 22 may comprise one element, and tooth 23 may comprise two elements spaced circumferentially a slight distance apart. In this way, rotor position sensor 21 produces one pulse in response to passage of tooth 22 and two pulses upon passage of tooth 23, thus identifying the instant blades 11 and 12, respectively, are aligned with the reference direction.

As above noted, upon rotation, mast 16 is subject to two forces of concern. One is an unbalanced inertia force generated because the center of gravity of the blade system is not at the mast axis. The other is due to unbalanced aerodynamic forces.

In accordance with the present invention, evidence of pylon motion is measured synchronously to detect the one-per-rev signal, and to resolve this signal into span and chord coordinates. The span coordinate extends along the blade axes. The chord coordinate is perpendicular to the span coordinate. A sequence of measurements logically permits one-per-rev sources to be isolated and identified in terms of parameters that can be adjusted, e.g., blade tip weight, pitch link, etc. One such operation is normally carried out in fitting a new rotor to a helicopter before it is released from inspection and check out procedures.

The sensing system includes a selector switch and a simple meter type indicator on the control panel to be used by the pilot and/or flight-test engineer to isolate any out of track condition and to guide any adjustments required. The indicator is a readout of the magnitude of unbalance. The position of a selector switch defines the measurements as being: (1) chordwise inertial unbalance; (2) spanwise inertial unbalance; (3) chordwise aerodynamic unbalance; and (4) spanwise aerodynamic unbalance. The inertial measurements are made on the ground for a zero thrust condition while the aerodynamic unbalance measurements are made in flight.

A one-per-rev force, as used herein, is defined as the unbalanced composite rotor force applied at the top of the mast and perpendicular to the mast. To provide a practical and economical system, the one-per-rev force is sensed with reference to the nonrotating system, e.g., the signal will appear as a sine wave at sensor 20.

The alignment and calibration of the equipment entail: establishing a suitable sensitivity for the meters; determining the phase relationship between mast moment and pylon motion; and calibrating the meters in terms of the required correction per unit of meter deflection, e.g., turns of pitch link per division of meter deflection.

Figure 4:
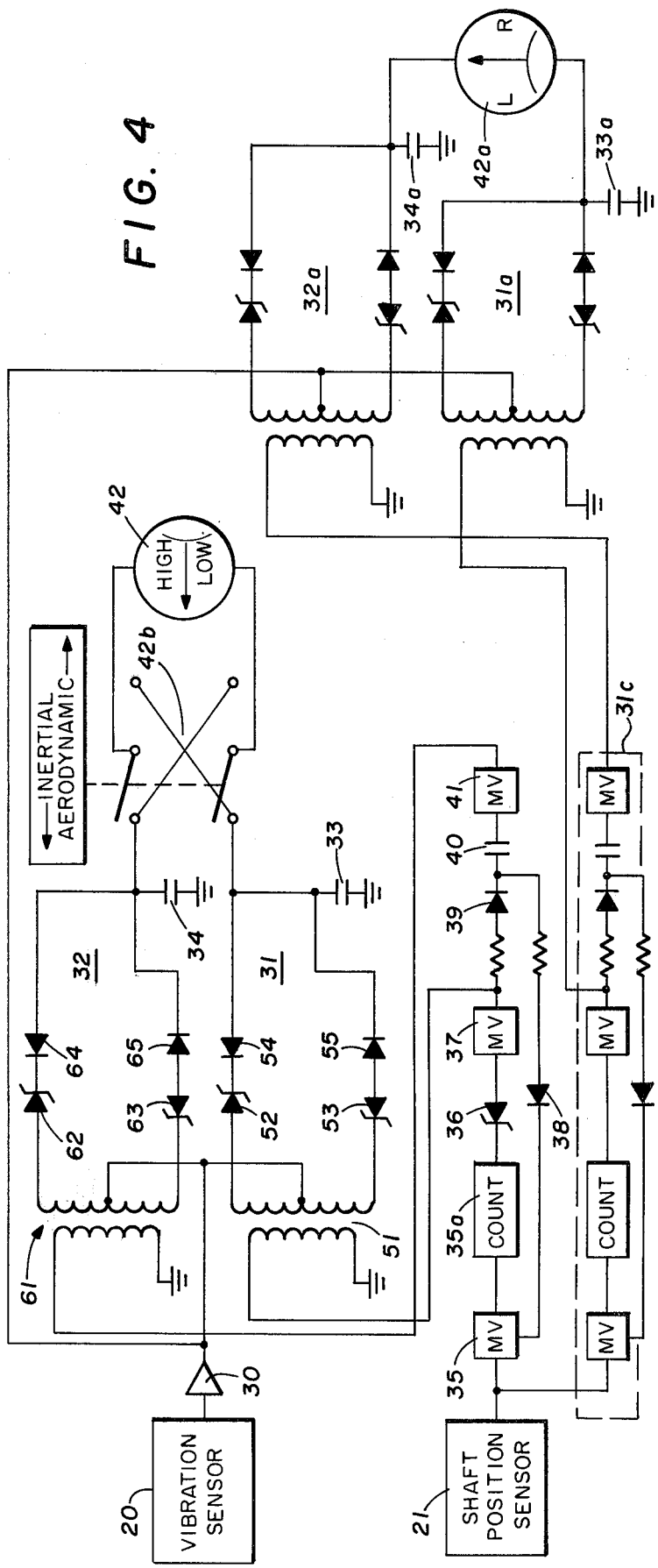
FIG. 4 is a functional block diagram of one embodiment of the invention.
Figure 3:
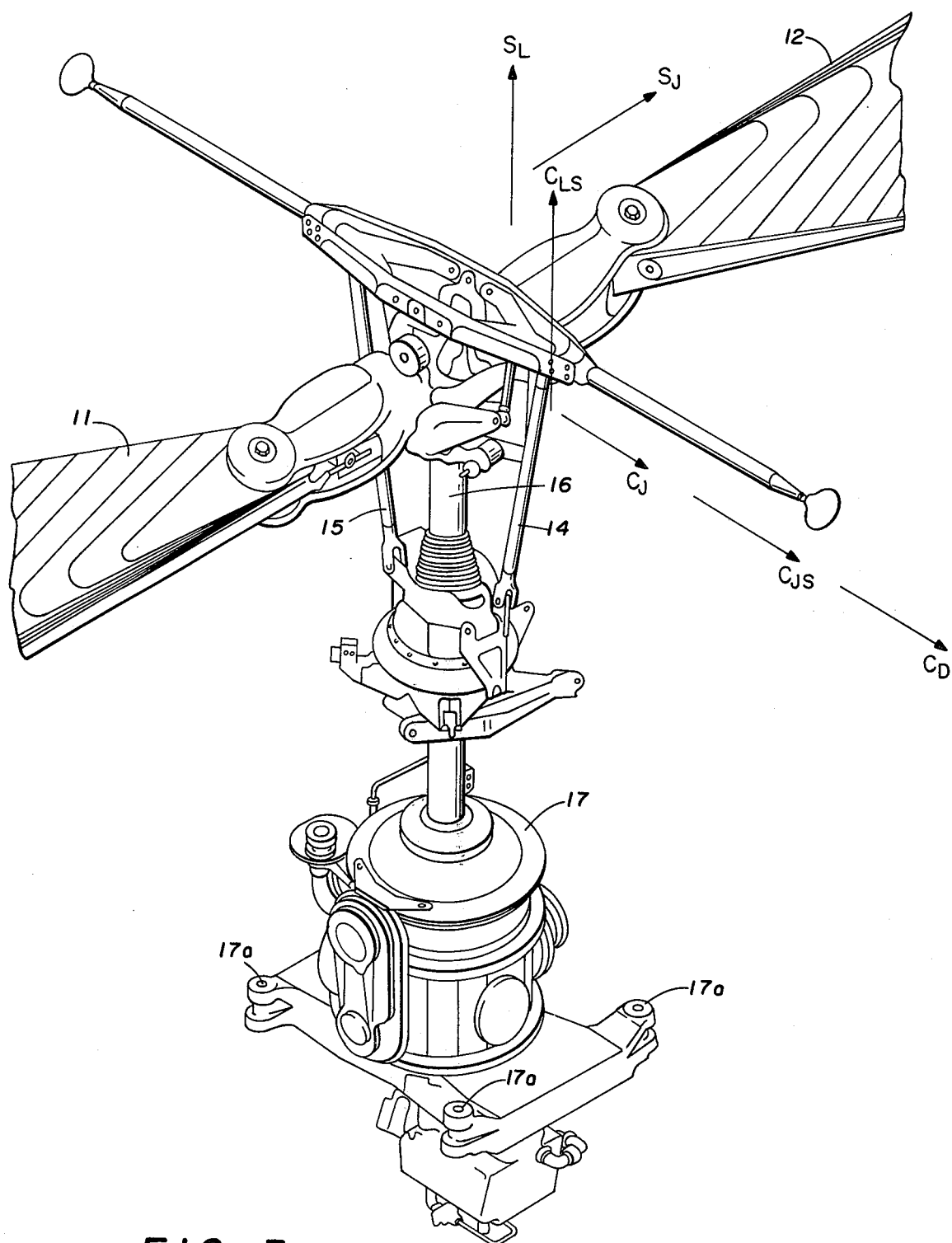
FIG. 3 illustrates forces in a two-bladed helicopter system.

The forces considered in making the necessary initial calibration and in use thereafter are designated by symbols shown in FIG. 3 and defined as follows:

$S_J$ — measured inertial span unbalance
$S_L$ — measured span lift unbalance
$C_J$ — measured inertial chord unbalance
$C_{JS}$ — measured inertial chord unbalance from sweep of blades
$C_{LS}$ — measured chord lift unbalance from sweep of blades
$C_D$ — measured chord drag unbalance resulting from span lift unbalance
K — ratio of $C_D/S_L$; this may be a function of $S_L$ in place of a direct ratio FIG. 4 illustrates one form of electronic circuit implementing an embodiment of the invention.

Vibration sensor 20 is connected at its output to an amplifier 30. The output of amplifier 30 is connected to the center tap of a transformer 51, the output terminals of which are connected to a capacitor 33 and to one terminal of a meter 42. The upper terminal of transformer 51 is connected by way of a Zener diode 52 and a diode 54 to capacitor 33. The lower terminal of transformer 51 is connected by way of Zener diode 53 and diode 55 to capacitor 33. Zener diode 52 and 53 are oppositely poled, as are diodes 54 and 55. The primary of transformer 51 is connected to the output of a one shot multivibrator 37.

The output of amplifier 30 is also connected to the center tap of the secondary winding of a transformer 61. The upper terminal of transformer 61 is connected by way of Zener diode 62 and diode 64 to a capacitor 34 and to the second terminal of meter 42. The lower terminal of transformer 61 is connected by way of Zener diode 63 and diode 65 to capacitor 34 in meter 42. Diodes 62 and 63 are oppositely poled as are diodes 64 and 65. The primary of transformer 61 is connected to the output of a one shot multivibrator 41.

Shaft position sensor 21 is connected to a one shot multivibrator 35, whose output is connected to a two-pulse counter 35a. The output of counter 35a is connected by way of Zener diode 36 to the multivibrator 37. Multivibrator 37 is connected by way of diode 39 and capacitor 40 to multivibrator 41. The juncture between diode 39 and capacitor 40 is connected by way of diode 38 to the output of multivibrator 35. The circuit of transformer 51 thus forms a gate 31 and the circuit of transformer 61 forms a gate 32 to store on capacitors 33 and 34 charges proportional to the signal from amplifier 30 at the instants gates 31 and 32, respectively, are momentarily rendered conductive. Multivibrator 37 turns gate 31 on when blade 11 is aligned with the selected reference direction. Multivibrator 41 turns gate 32 on when blade 12 is aligned with the selected reference direction. Meter 42 exhibits the difference and thus indicates span unbalance.

For purpose of illustration, a second set of gates 31a and 32a cooperate with capacitors 33a and 34a to store charges proportional to the amplitude of the output of amplifier 30 at the instant gates 31a and 32a are rendered conductive.

Meter 42a exhibits chord unbalance in that gates 31a and 32a are turned on when movement due to blade 11 right is aligned with the reference direction and gate 32a is turned on when movement due to blade 12 right is aligned with the reference direction.

It will be understood that the system preferably will be provided with a selector switch to change the time constants of units 37 and 41 to change the reading on meter 42 from span to chord unbalance as desired. In such case, the circuits 31a, 32a and 31c may be eliminated.

Figure 5:
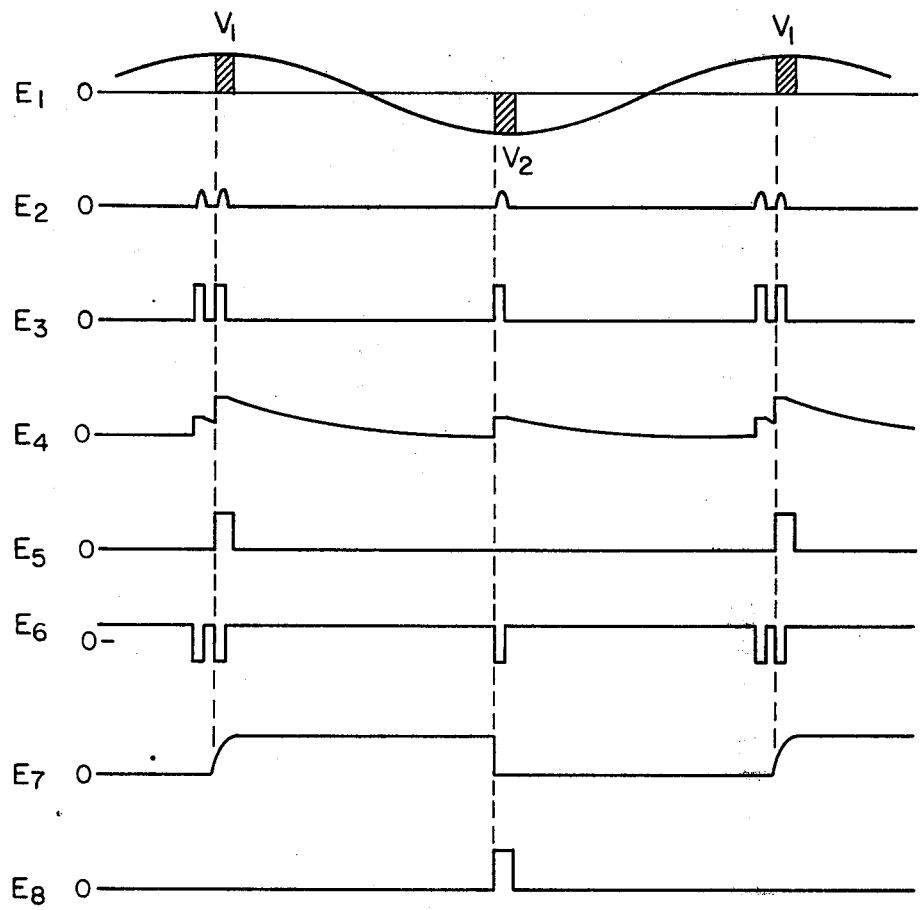
FIG. 5 is a graphical presentation of electrical signals at selected points in the block diagram of FIG. 4.

FIG. 5 shows typical waveform patterns involved in operation of the circuit of FIG. 4.

Position signals E2 are derived from the output of shaft position sensor 21. Such signals are applied to units 31 and 32 to open gates 31 and 32 and process instantaneous samples of the signal from vibration sensor 20 to two storage capacitors 33 and 34. The samples represent the magnitude of the signals when the rotor blades 11 and 12 are aligned with the reference direction. The samples are stored and compared. The difference between them indicates the amount and direction of unbalance force.

Sensor 20 is connected through amplifier 30 to the inputs of gates 31 and 32. The amplified unbalance signal is represented by waveform E1, FIG. 5. For simplification, any inherent two-per-rev signal is not shown since the one-per-rev sampling circuitry rejects it.

The single and double pulse outputs E2 of rotor position sensor 21 are fed to the input of one-shot multivibrator 35. The function of multivibrator 35 is to provide uniform samples of the pulse outputs from sensor 21 illustrated by waveform E3. Each pulse triggers multivibrator 35 and produces a corresponding positive square wave pulse. This output is fed to two-pulse counter 35a. Counter 35a includes a simple resistance-capacitance network charged by each pulse signal from shaft position sensor 21. The time constant is chosen to permit the charge to drain off before the next coded signal as shown by waveform E4.

The output of two-pulse counter 35a is applied to the cathode of Zener diode 36. Zener diode 36 has the conventional diode characteristic of substantially unidirectional conduction but reverse conduction occurs when a threshold voltage is exceeded. Zener diode 36 is connected so that current normally flows from right to left whenever the anode voltage is more positive than the cathode voltage. However, current will also flow from left to right when a positive differential voltage exceeding a threshold is applied to the cathode. A charge accumulated from two-pulse counter 35a resulting from a single positive pulse corresponding to position signal for reference blade 12 is less than the required positive threshold voltage. Zener diode 36 will be fired, i.e., conduct current from left to right, only by a charge in counter 35a accumulating from the double pulse corresponding to a position signal for blade 11.

When diode 36 conducts, it triggers a one-pulse generator such as one-shot multivibrator 37. The single square wave output of multivibrator 37 shown in waveform E5 serves as a gating signal for rendering unit 31 conductive to cause hold unit 33 to store an instantaneous sample $V_1$ of the signal from amplifier 30 representative of blade 11 being aligned in the reference position.

In order to render gate 32 conductive when blade 12 passes through the reference direction, a one pulse generator such as one-shot multivibrator 41 is triggered in response to the single pulse from sensor 21. Unit 41 is not triggered by the double pulse. The circuit of FIG. 4 accomplishes this with an arming means comprising two diodes 38 and 39 and a current storage capacitor 40.

Waveform E6, the negative of waveform E3, is derived from the output of multivibrator 35 and applied to the cathode of diode 38. Diodes 38 and 39 are connected in series with the anode of diode 38 connected to cathode 39. The output of multivibrator 37, waveform E5, is applied to the anode of diode 39. One side of capacitor 40 is connected to the junction between diodes 38 and 39, and the other side leads to the input to one-shot multivibrator 41, which may be triggered by a negative pulse only.

In operation, capacitor 40 is charged or armed by each positive pulse from one-shot multivibrator 37 and is discharged by the succeeding single negative pulse form one-shot multivibrator 35. This sequence can be understood by considering waveforms E5, E6 and E7 of FIG. 5 in conjunction with the circuit of FIG. 4. The extreme left-hand portions of these waveforms represent the condition of the circuit after capacitor 40 has been discharged and just prior to the recharging or arming pulse from one-shot multivibrator 37.

The voltage relation between waveforms E5 and E6 is important for the proper functioning of the circuit. If the baseline voltage of waveform E5 is chosen as a reference (designated "0" in FIG. 5), then the baseline voltage of waveform E6 is positive by an amount sufficient to establish the reference voltage as the peak value of the negative pulses of E6. The positive baseline voltage of E6 is substantially equal to the peak value of the positive pulses of E5. Finally, the pulse width of the E5 is greater than the width of the E6 pulse, FIG. 5.

Discharge of capacitor 40 leaves the capacitor voltage E7 substantially equal to the reference voltage. Because the cathode of diode 38 shown by waveform E6 is more positive than the anode of diode 39 shown by waveform E5, flow of current to recharge capacitor 40 is prevented. The first of the double negative pulses E6 merely brings the cathode voltage of diode 38 down to the reference level. No differential exists across the two diodes, and there is no change in voltage E7. Also, capacitor 40 is in a discharge State.

The second of the double negative pulse E6 coincides with the positive pulse of E5. This causes the anode of diode 39 to be positive in relation to the cathode of diode 38. As a result, current flows through diodes 39 and 38 partially charging capacitor 40 to a voltage intermediate the reference voltage and the peak positive value of E5. At the termination of the second of the double negative pulses of E6, the cathode of diode 38 is at a positive value equal to the peak value of waveform E5. Conduction through diode 38 ceases, but conduction through diode 39 continues until capacitor 40 is charged to substantially the same voltage as the peak positive value of waveform E5. At the termination of the positive pulse of waveform E5, the anode of diode 39 returns to the reference voltage, thereby preventing any further current flow through diode 39 for the duration of the cycle.

Later, by one half revolution of mast 16, the single negative pulse of waveform E6 occurs, dropping the cathode voltage of diode 38 to the reference voltage. Because of the positive charge on capacitor 40, a differential voltage then exists across diode 38, and current flows until capacitor 40 is discharged again to substantially the reference voltage. As capacitor 40 discharges, it triggers one-shot multivibrator 41, and the cycle then repeats.

The square wave output of multivibrator 41 shown by waveform E8 serves as a gating signal for gating unit 32, in the same manner as multivibrator 37 gates unit 31, to permit storage of the instantaneous value $V_2$ shown by waveform E1, of the signal from amplifier 30 due to motion produced by reference blade 12 passing the reference position.

The two stored values $V_1$ and $V_2$ are then compared by means of null-type meter 42. Assuming a relatively large lift unbalance caused by steeper pitch angle of blade 12, blade 12 will not track reference blade 11, but will follow path 12a above the path 11a of blade 11, as shown in FIG. 1. This condition is reflected on meter 42 which reads LOW, meaning that reference blade 11 is tracking below blade 12. The amount of the deflection of the meter needle is an indication of the amount of blade 12 pitch angle adjustment required.

In such case, if meter 42 is calibrated in degrees of pitch angle, the pilot may land, stop the rotor and adjust the linkages 14 and 15 leading to the pitch horn sufficient to cause the needle to be centered when again in hover to minimize vibration from unequal lift unbalance forces.

Alternatively, the difference between stored values $V_1$ and $V_2$ can be used to drive a servo controlled automatic pitch correcting system if desired. In this way, vibrations from unequal lift forces can be continuously monitored and corrected without the need for attention from the pilot.

In order to achieve the foregoing, it is necessary to calibrate the system. When checking for inertial balance, a switch 42b is in one position and to evaluate aerodynamic unbalance switch 42b is set in a second position. Assume the reference position for blade 11 to be zero degrees (dead ahead). If blade 11 is heavier than blade 12 or has a higher lift, the span meter 42 deflection will be considered positive and will read HIGH. If the cg of the rotor system, center of lift, or drag component is to the right of the mast for the reference blade position, the chord meter 42a will read RIGHT.

The meters initially may be set in sensitivity so that a suitable value, e.g., ±0.1 inch, of one-per-rev pylon motion will result in full-scale deflection.

As above noted, mast displacement caused by a one-per-rev force will lag the force vector, typically about 140° for a two-bladed rotor. Hence the measurement of one-per-rev displacement has to occur 140° after the axis of interest, the span axis or the chord axis, of the blade has passed the point of measurement, i.e., the azimuthal location of the motion sensor 20. Proper phasing may be established under conditions of a ground run at nominal r.p.m. and flat pitch using a rotor chosen to have good track. The following steps are then taken.

a. Read and record span and chord meters. These readings will be used for the phase adjustment.

b. Add suitable span weight to the tip and on the chord axis of the blade 11.

c. Read and record span and chord readings.

d. Determine the change in the meter readings (effects of the span weight) by subtracting the Step a. readings from the readings in Step c.

e. Determine the angular phasing error, $\theta$, of the sampling pulse by the expression, $$\arctan \theta = \frac{\Delta \text{ chord reading}}{\Delta \text{ span reading}}$$

f. The phasing is correct by adjusting the sampling pulses $\theta$ "rotor degrees". This can be done electrically or by rotating the azimuth position sensor 21.

g. Measure and record span and chord balance.

h. Optimize span meter sensitivity.

i. Remove span weight and read span and chord meters. The chord reading should not be affected by the removal of the span weight if phasing is corrected.

j. Add suitable chord weight.

k. Optimize sensitivity of chord meter 42a.

l. For information, read and record span unbalance. If the chord weight appreciably affects the span reading, a correction factor for drag will be included in the calibration procedures.

m. Remove chord weight. Read and record span and chord meters. These readings will be used as baseline data.

PHASING should now be correct for resolving a one-per-rev force vector into the span and chord components.

All calibrations are at normal rotor r.p.m. Baseline data may be used to normalize all readings.

BASELINE DATA a. Ground run at flat pitch and record span and chord readings.

b. Hover out of ground effect (OGE), i.e., more than about 1½ rotor diameters in elevation, and record span and chord readings.

c. In forward flight, record span and chord readings for airspeeds of 80, 100, and 120 knots.

SPAN TIP WEIGHT CALIBRATIONS a. Add tip weight to the blade 11 that will cause a discernible one-per-rev vibration.

b. Ground run with rotor at flat pitch and record span, $S_J$, and chord readings.

c. Double the weight and repeat test.

d. Establish span meter 42 calibration in terms of weight on blade tip per unit of meter deflection.

e. Remove tip weights.

CHORD-WEIGHT CALIBRATIONS a. Add chord weights that will cause a discernible one-per-rev vibration.

b. Ground run at flat pitch and record chord, $C_J$, and span readings.

c. Double weights and repeat test.

d. Establish chord meter 42a calibration in terms of chord weight per unit of meter deflection.

e. Remove weights.

SPAN-LIFT LINK CALIBRATION a. Increase angle of attack of blade 11 to produce an appreciable one-per-rev vibration.

b. Hover OGE and record span, $S_L$, and chord readings, $C_D$.

c. Double adjustment and repeat test.

d. Take readings at 80, 100, and 120 for information.

e. Triple original adjustment and repeat test.

f. Establish calibration in terms of turn of pitch link for hover measurements.

g. Plot curves and establish the relationship between the chord unbalance (from drag) with the span lift unbalance, e.g., $C_D = S_L \times K$ where $K$ relates lift unbalance to chord balance.

h. Return pitch link to original setting.

CHORD SWEEP CALIBRATIONS (INERTIAL UNBALANCE)

a. Sweep blade 11 aft an amount that will cause an appreciable one-per-rev vibration.

b. Ground run at flat pitch and record chord, $C_{JS}$, and span reading.

c. Double the sweep of blade 11 and repeat test.

d. Leave sweep of blade as is for next test.

CHORD SWEEP CALIBRATION (AERODYNAMIC UNBALANCE)

a. Hover OGE and record chord and span, $S_{LS}$, readings.

b. Return sweep to half value and repeat test.

c. Take readings at 80, 100, and 120 knots for information.

d. Use data from Span-Lift Link Calibration and Chord Sweep Calibrations (Inertial Unbalance) above to obtain $C_J$, $C_{JS}$, and $C_D$ so that $C_{LS}$ can be determined from: $C_J + C_{JS} + C_D - C_{LS} =$ chord meter reading ($C_J = 0$ for this condition)

e. Calibrate in terms of turns of drag brace per unit of $C_{LS}$.

f. Return drag brace to original setting.

This completes calibration procedures.

The tracking procedures are very similar to the calibration procedures. The approach is to logically establish a sequence of measurements that will isolate the one-per-rev sources in terms of the parameters that can be adjusted. The adjustments are essentially the same as the ones presently used with the exception that chord weights will be used.

The sequence of performing the tracking measurements are listed below with their respective means for adjustments.

1. Span inertial balance — tip weights
2. Chord inertial balance — chord weights
3. Chord aerodynamic balance — drag brace
4. Span aerodynamic balance — pitch link The procedures in more detail are as follows:

TRACKING PROCEDURE TEST

Step 1: Span Inertial Balance — Flight condition: ground run, nominal r.p.m., and flat pitch. This test is conducted first since the measurement and adjustments can be effectively isolated.

a. Read and record span meter ($S_J$).

b. Add or subtract tip weights on the chord axis accordingly.

Step 2: Chord Inertial Balance — flight condition: ground run, nominal r.p.m., and flat pitch.

a. Read and record chord meter ($C_J + C_{JS}$).

b. The reading cannot be used directly since the meter measures the effects of sweep as well as chord mass unbalance. Hence, it is necessary to check and adjust the sweep of the blade prior to determining if a chord weight adjustment is needed.

c. The above data are needed in Step 3.

Step 3: Chord Aerodynamic Balance — Flight condition: hover OGE at nominal r.p.m.

a. Read and record span and chord ($C_J + C_{JS} + C_D - C_{LS}$) meters.

b. From span reading determine the chord drag component $C_D = S_L \times K$.

c. Use $C_J + C_{JS}$ from Step 2 and the equation, $C_J + C_{JS} + C_D - C_{LS} =$ meter reading, to determine $C_{LS}$ and correct sweep accordingly by adjusting the drag braces.

This adjustment has corrected the sweep of the blades and, hence, has positioned the center of lift on the chord axis of the blades. With this accomplished, any residual inertial chord unbalance ($C_J$) can now be isolated and corrected in Step 4.

Step 4: Chord Inertial Balance — Flight condition: ground run, nominal r.p.m., and flat pitch.

a. Read and record chord meter ($C_J$).

b. Add or subtract chord weights as required.

Step 5: Span Aerodynamic Balance — Flight condition: hover OGE at nominal r.p.m.

a. Read and record the span and chord meters. If the span meter indicates an unbalance of $S_L$, the chord meter should read $K + S_L$.

b. Adjust lift link to balance the lift of the two blades. Balancing the lift of the two blades should also balance the drag of the two blades. Hence, the chord meter should now indicate a balance condition.

By foregoing procedures the rotating system is inertially balanced and the rotor blades are aerodynamically balanced for hover. Thereafter, the blades should be in track throughout the flight envelope except for variation in tolerances from blade to blade. If the variations are appreciable, it may be necessary to adjust a blade tap to obtain track at the higher airspeeds.

In accordance with a further aspect of the invention, automatic tracking of a helicoptor rotor system in span only sense is achieved while in flight. The above described rotor track sensor can be employed with an actuation system in the cyclic pitch control system. Such a system useful where the rotor does not track, i.e., where the above balancing procedures have not been undertaken to provide complete balance or when a change in the system after completion of the balance procedures produces unbalance.

A suitable actuator system is described and claimed in applicant's prior U.S. Pat. No. 3,584,814. This combination achieves active rotor tracking in that it senses an out-of-track condition and synchronously nutates the swashplate at the proper magnitude and phase, relative to the rotor, to cause the blades to track. A differential pitch link length change is produced in response to the output of sensor 20. The system is a closed loop and therefore will achieve tracking at high speed as well as at hover.

An automatic tracker requires continuous motion of the swashplate. It will, therefore, affect the life of the control system. Preferably it will primarily be used for such tasks as maintaining rotor track during a rotor configuration transition such as in operation of a telescopic rotor. Also, the tracker can be used to maintain blade track, within certain limitations, if the rotor is damaged from gun fire, flying debris, tree limbs, etc. If the rotor is damaged as from gun fire, the automatic tracking feature could mean the difference between completing a mission or not completing the mission. Also the difference between making a safe "forced landing" or a crash "forced landing" can be appreciated. The tracker can also be used to measure the degree of "out-of-track" by calibrating the one-per-rev actuator displacement in terms of pitch link change.

Figure 6:
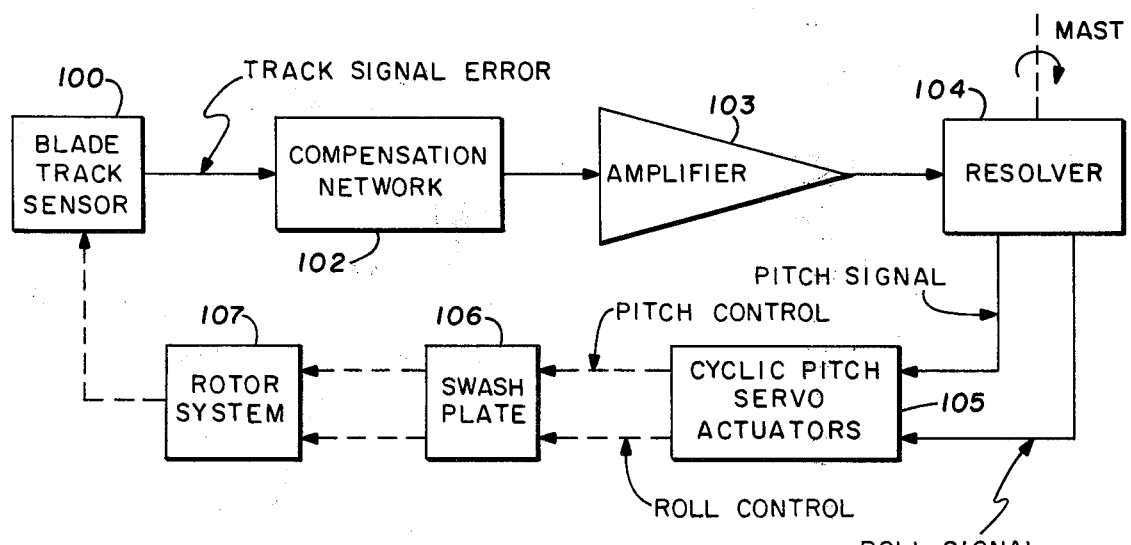
FIG. 6 illustrates an automatic balance operation.

Automatic rotor blade tracking involves a closed loop as shown in FIG. 6. For an out-of-track condition, the blade track sensor 100 measures the track error which is, in turn, shaped in the compensation network 102, amplified in amplifier 103, and then synchronously resolved into pitch and roll track error signal in resolver 104 which is driven from the mast. The two cyclic pitch signals have a 90° phase relationship and in turn are phased relative to the mast to oppose the track error. The properly phased cyclic signals are applied to the cyclic pitch servo actuators 105 which produce displacement outputs that are proportional to the respective electrical signal inputs. The combined effect of the driven acuators nutate the swashplate 106 which closes the loop to the rotor system 107. The swashplate is in effect slaved to the output of the resolver 104.

Blade track sensor 100 is a blade tracking device that will produce a usable error signal as described in connection with FIGS. 1–5. It can be geometrical or force track error.

Compensation network 102 is an electrical network as commonly used for feedback loop stability. Amplifier 103 is an electronic amplifier used to amplify the error signal and to excite the resolver. Resolver 104 resolves the error signal into pitch and roll signals that are modulated at mast frequency. The resolver can be electromechanical or electronic. Cyclic servo actuators 105 are position servos that displace the swashplate in accordance with the resolver output error signals.

It will be recognized that the measurement produced by sensor 20 of FIG. 2 is but one manifestation of one-per-rev rotor unbalance signals induced into the airframe. It has been found that other manifestations can be sensed in the frame of the aircraft. It has been found that a vertical vibration sensor, for example, on the floor of the helicopter can be utilized in the span only channel of an automatic actuator controlled system to eliminate one per rev vibrations. Thus, while the sensor 20b is shown in FIG. 2, it is representative of sensors that may be placed elsewhere in the system for providing guidance in eliminating undesirable vibration.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of minimizing one-per-rev vibration in a helicopter due to rotor unbalance which comprises:

generating a one-per-rev vibration signal for at least two blades of the rotor as a manifestation of rotor unbalance, sampling said signals when each of the rotor blades are successively in alignment with a reference direction during each cycle of rotation of said rotor, and generating a difference signal by comparing samples of said signals from each of the rotor blades to represent by magnitude and phase the character of said unbalance.

2. The method of claim 1 including displaying the generated difference signal to provide a guide for required correction of vibration inducing rotor unbalance.

3. The method of claim 1 in which a span component of said unbalance difference signal drives an actuator on the helicopter swashplate dynamically to minimize one-per-rev vibration.

4. The method of claim 1 in which said vibration signal is sampled four times per revolution of said rotor at quadrature points one of which is with one of said blades at said reference direction and samples taken at 180° points are compared to indicate chordwise and spanwise unbalances.

5. The method of minimizing one-per-rev vibrations in a helicopter due to a rotor unbalance which comprises:
   generating a one-per-rev vibration signal manifestation of rotor unbalance,
   sampling said signal when the rotor blades are successively in alignment with a reference direction during each cycle of rotation of said rotor,
   generating a difference signal from said samples to represent by magnitude and phase the character of said unbalance, and
   resolving the signal into span and chord components to isolate out of track conditions and provide a guide for required adjustment of vibration inducing rotor unbalance.

6. The method of claim 5 wherein the one-per-rev vibration signal is generated with the helicopter on the ground with the rotor at a normal speed with zero thrust to measure inertial unbalance.

7. The method of claim 5 wherein the one-per-rev vibration signal is generated with the helicopter hovering at normal rotor speed to measure aerodynamic unbalance.

8. The method of minimizing one-per-rev vibration in a helicopter airframe when supported by a mast driven rotor which comprises:
   a. rotating said rotor at normal rotor speed and zero lift,
   b. generating a signal representative of unbalance force on said mast due to displacement of the center of gravity of the rotor from the mast axis,
   c. modifying the rotor in magnitude proportional to the magnitude of said signal and in direction dependent upon the span and chord components of said signal,
   d. hovering said helicopter at normal rotor speed,
   e. generating a signal representative in phase and magnitude of unbalance moments on said mast due to aerodynamic forces on said mast, and
   f. modifying the aerodynamics of said rotor in magnitude proportional to the magnitude of said signal and direction dependent upon said components of said signal.

9. A system to aid in minimizing one-per-rev vibration in a helicopter airframe when supported by a mast driven rotor which comprises:
   a. means to generate a signal representative of unbalance force on said mast due to displacement of the center of gravity of the rotor from the mast axis when rotating at normal rotor speed and zero lift, whereby the rotor may be modified in magnitude proportional to the magnitude of said signal and in direction dependent upon the span and chord components of said signal, and
   b. means to generate a signal representative in phase and magnitude of unbalance moments on said mast due to aerodynamic forces on said mast when hovering said helicopter at normal rotor speed whereby the aerodynamics of said rotor may be modified in magnitude proportional to the magnitude of said signal and direction dependent upon said components of said signal.

10. The system of claim 7 wherein the motion of the mast relative to the airframe is continuously sensed and the resulting signal is synchronously sampled and stored to produce said unbalance signal.

11. The system of claim 10 in which said resulting signal is multiply sampled for each mast revolution to produce span and chord unbalance signals.

12. The system of claim 11 in which the phase at which said resulting signal is sampled is in quadrature and is sampled four times per revolution.

13. The system of claim 12 in which said phase lags the blade alignment with a reference direction by the phase lag of a two bladed rotor system to produce said resulting signal representative of displacement of said mast.

14. A system for sensing and comparing unbalanced vibrational forces exerted by rotor blades of a rotary wing aircraft which are transmitted through its mast to a rotor support mounting, comprising:
   a. generator means to generate a first position signal when a first rotor blade is aligned with a reference direction fixed with respect to said mounting structure and a second position signal when a second rotor blade is aligned with said reference direction,
   b. vibration sensing means responsive to said unbalanced forces exerted in said reference direction for providing a vibration signal,
   c. first sampling means connected to said vibration sensing means and responsive to the first position signal for selecting as a first force signal sample the value of the vibration signal when the first blade is aligned with the reference direction,
   d. second sampling means connected to the vibration sensing means and responsive to the second position signal for selecting as a second force signal sample the value of the vibration signal when the second blade is aligned with the reference direction, and
   e. means connected between the first and second sampling means for comparing the first force signal sample with the second force signal sample.

15. The system according to claim 14 wherein the comparing means comprises:
   a meter connected to indicate the algebraic difference between the first and second force signals.

16. The system according to claim 14 wherein the vibration sensing means comprises:
   a sensor on said mounting structure and having a sensitive axis aligned with said reference direction.

17. The system according to claim 14 wherein the means for providing a first and second position signal comprises:
   a. position sensing means for providing a single pulse when the first blade is aligned with the reference direction and a double pulse when the second blade is aligned with the reference direction, and
   b. means to render said generator means responsive to each said single pulse and to each said double pulse to produce two output signals for each revolution of said mast.

18. The system according to claim 17 wherein the position sensing means comprises:
   a. a single ferrous element affixed to said mast adjacent said mounting structure in alignment with one of said blades,
   b. a pair of ferrous elements affixed to said mast adjacent said mounting structure in alignment with the second blade, and c. a magnetic sensor mounted on said mounting structure adjacent said mast and in alignment with the reference direction and responsive to the single ferrous element and the pair of ferrous elements to provide, respectively, the single pulse and the double pulse.

19. The system according to claim 17 wherein said sensor is connected to two generators a first of which includes counting means for providing a first triggering signal in response only to the double pulse, and a first one-pulse generator responsive to the first triggering signal for producing the second position signal.

20. The system according to claim 17 wherein said first generator includes triggering means connected between said sensor and the second generator for providing a second triggering signal, arming means in said second generator operable in response to the second position signal to fire in response to the single pulse from said sensor and a second one-pulse generator responsive to the second triggering signal for producing the first position signal.

21. A system according to claim 20 wherein the triggering means comprises:
 a. a charge storage device connected to the input of the second one-pulse generator to actuate said second one-pulse generator upon discharge thereof,
 b. a first unidirectional current flow controlling device interposed between the first one-pulse generator,
 c. means to charge said storage device through the first unidirectional current flow controlling device in response to said second position signal,
 d. a second unidirectional current flow controlling device interposed between said position sensing means and said current storage device, and
 e. means to discharge said current storage device through the second unidirectional current flow controlling device in response to the single pulse from the position sensing means.

22. The system according to claim 21 wherein:
 a. the current storage device is a capacitor, and
 b. the first and second unidirectional current flow controlling devices are diodes.

23. A sensing and comparing device in accordance with claim 14 wherein said first and second sampling means comprise:
 a. first and second storage means for accepting and storing samples of said vibration signal, and
 b. first and second gate means connected respectively to the first and second storage means and actuated respectively by the first and second position signals for applying said vibration signal respectively to said first and second storage means.

* * * * *

PO-1050
(5/69)

UNITED STATES PATENT OFFICE
CERTIFICATE OF CORRECTION

Patent No. 3,938,762      Dated Feb. 17, 1976

Inventor(s) Milford R. Murphy

It is certified that error appears in the above-identified patent and that said Letters Patent are hereby corrected as shown below:

Col. 6, line 10, "31cmay" should be --31c may--.
Col. 7, line 35, after "E5" insert --pulse--;
       line 45, "State" should be --state--.
Col. 9, line 6, "correct" should be --corrected--.
Col. 11, line 19, "K + $S_L$" should be --K x $S_L$--.

Signed and Sealed this twenty-seventh Day of April 1976

[SEAL]

Attest:

RUTH C. MASON            C. MARSHALL DANN
*Attesting Officer*          *Commissioner of Patents and Trademarks*